United States Patent
Brooks et al.

(10) Patent No.: US 8,234,259 B2
(45) Date of Patent: Jul. 31, 2012

(54) METHOD AND SYSTEM FOR ADJUDICATING TEXT AGAINST A DEFINED POLICY

(75) Inventors: Randall S. Brooks, Apollo Beach, FL (US); Ricardo J. Rodriguez, Palmetto, FL (US); Sylvia A. Traxler, Seminole, FL (US)

(73) Assignee: Raytheon Company, Waltham, MA (US)

( * ) Notice: Subject to any disclaimer, the term of this patent is extended or adjusted under 35 U.S.C. 154(b) by 359 days.

(21) Appl. No.: 12/437,754

(22) Filed: May 8, 2009

(65) Prior Publication Data

US 2010/0287182 A1 Nov. 11, 2010

(51) Int. Cl.
*G06F 7/00* (2006.01)
*G06F 17/00* (2006.01)
(52) U.S. Cl. . 707/698; 707/747; 707/800; 707/E17.036; 707/E17.052; 709/206; 709/224; 709/225; 709/226
(58) Field of Classification Search ............... 707/711, 707/747, 800, 801, 802, 698, E17.036, E17.052; 709/206, 224, 225, 226
See application file for complete search history.

(56) References Cited

U.S. PATENT DOCUMENTS

| | | | |
|---|---|---|---|
| 6,493,744 B1 | 12/2002 | Emens et al. | |
| 6,609,196 B1 | 8/2003 | Dickenson, III et al. | |
| 6,684,202 B1 | 1/2004 | Humphrey et al. | |
| 6,754,662 B1 * | 6/2004 | Li | 707/693 |
| 7,136,913 B2 * | 11/2006 | Linderman | 709/223 |
| 7,293,065 B2 * | 11/2007 | Banister et al. | 709/206 |
| 7,293,238 B1 * | 11/2007 | Brook et al. | 715/736 |
| 7,349,959 B2 * | 3/2008 | Imamura et al. | 709/223 |
| 7,356,585 B1 * | 4/2008 | Brook et al. | 709/224 |
| 7,370,054 B1 * | 5/2008 | Martin et al. | 707/747 |
| 7,756,930 B2 * | 7/2010 | Brahms et al. | 709/206 |

(Continued)

FOREIGN PATENT DOCUMENTS

GB  2 343 030   4/2000

OTHER PUBLICATIONS

Magnus Merkel & Mikael Andersson—"Knowledge-lite extraction of multi-word units with language filters and entropy thresholds"— Proc. 2000 Conf. User-Oriented Content-Based . . . , 2000—Citeseer (pp. 1-10).*

(Continued)

*Primary Examiner* — John E Breene
*Assistant Examiner* — Anh Ly
(74) *Attorney, Agent, or Firm* — Daly, Crowley, Mofford & Durkee, LLP

(57) ABSTRACT

A computerized method of adjudicating text against a policy includes receiving one or more system policies, creating a system datastructure for each received system policy, receiving an input message comprising a text to be adjudicated, selecting a system policy from the one or more received system policies based on the input message, and processing the text to be adjudicated and the system datastructure corresponding to the selected system policy to determine if a prohibited word is present in the text to be adjudicated. The one or more system policies include one or more prohibited words and a first hit value corresponding to each prohibited word. The system datastructure includes a plurality of linked lists corresponding the letters of the alphabet and a head linked list operable to store one or more found prohibited words.

18 Claims, 2 Drawing Sheets

U.S. PATENT DOCUMENTS

| | | | |
|---|---|---|---|
| 7,895,649 B1* | 2/2011 | Brook et al. | 726/22 |
| 7,917,492 B2* | 3/2011 | Bargeron et al. | 707/708 |
| 7,930,516 B1* | 4/2011 | Jin et al. | 707/800 |
| 8,112,535 B2* | 2/2012 | Fishman et al. | 709/229 |
| 2004/0021691 A1* | 2/2004 | Dostie et al. | 345/773 |
| 2004/0205661 A1* | 10/2004 | Gallemore | 715/530 |
| 2004/0260778 A1* | 12/2004 | Banister et al. | 709/206 |
| 2005/0060643 A1* | 3/2005 | Glass et al. | 715/501.1 |
| 2005/0215273 A1* | 9/2005 | Ito | 455/518 |
| 2007/0027770 A1* | 2/2007 | Collins et al. | 705/14 |
| 2007/0033103 A1* | 2/2007 | Collins et al. | 705/14 |
| 2007/0083929 A1* | 4/2007 | Sprosts et al. | 726/22 |
| 2007/0220607 A1* | 9/2007 | Sprosts et al. | 726/24 |
| 2008/0147649 A1* | 6/2008 | Kim et al. | 707/5 |
| 2008/0189661 A1* | 8/2008 | Gundlach et al. | 715/863 |
| 2008/0270387 A1* | 10/2008 | Weitenberner | 707/5 |
| 2010/0185680 A1* | 7/2010 | Gilboa | 707/802 |
| 2010/0287182 A1* | 11/2010 | Brooks et al. | 707/769 |
| 2011/0093471 A1* | 4/2011 | Brockway et al. | 707/747 |

OTHER PUBLICATIONS

Radhouane Guermazi, Mohamed Hammami and Abdelmajid Ben Hamadou—"WebAngels Filter: A Violent Web Filtering Engine Using Textual and Structural Content-Based Analysis"—Advances in Data Mining. Medical Applications, E-Commerce, Marketing, and Theoretical Aspects Lecture Notes in Computer Science, 2008, vol. 5077/2008, (pp. 268-282).*

Patent Cooperation Treaty, Notification of Transmittal of the International Search Report and the Written Opinion of the International Searching Authority, or the Declaration, International Application No. PCT/US2010/031545, Mailed Oct. 18, 2010, 15 pages.

O'Brien et al., "Comparing SpamAssassin with CBDF email filtering," 5 pages, Internet Citation, Jan. 1, 2003.

Maurer et al., "Hash Table Methods," 15 pages, ACM Computing Surveys, vol. 7, No. 1, Mar. 1, 1975.

Knott, "Hashing Functions," The Computer Journal, vol. 18, No. 3, pp. 265-278, Dated: Sep. 30, 2010.

* cited by examiner

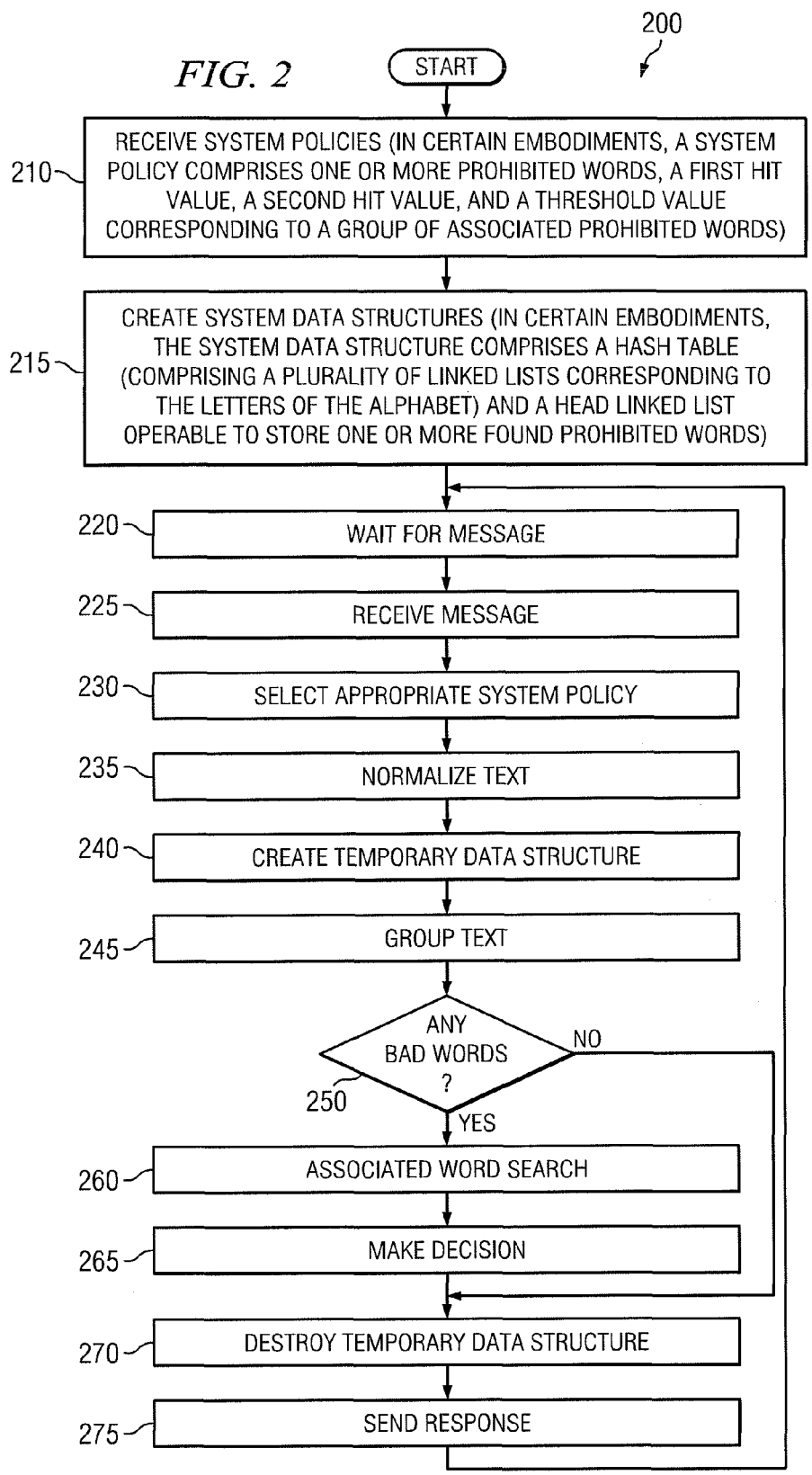

METHOD AND SYSTEM FOR ADJUDICATING TEXT AGAINST A DEFINED POLICY

TECHNICAL FIELD

This disclosure relates generally to the field of data verification and more specifically to a method and system for adjudicating text against a defined policy.

BACKGROUND

Many organizations utilize tools to scan data for sensitive information before allowing the data to be transmitted out of the organization. In one example, a company may utilize a tool to scan the text of an email from an employee. In another example, an organization may utilize a tool to scan the text of a document before it is released to another user or organization. Such tools may scan for proprietary and/or sensitive information that would not be appropriate to reveal to anyone other than authorized users.

SUMMARY OF THE DISCLOSURE

According to one embodiment of the present disclosure, a computerized method of adjudicating text against a policy includes receiving one or more system policies, creating a system datastructure for each received system policy, receiving an input message comprising text to be adjudicated, selecting a system policy from the one or more received system policies based on the input message, and processing the text to be adjudicated and the system datastructure corresponding to the selected system policy to determine if a prohibited word is present in the text to be adjudicated. The one or more system policies include one or more prohibited words and a first hit value corresponding to each prohibited word. The system datastructure includes a plurality of linked lists corresponding to the letters of the alphabet and a head linked list operable to store one or more found prohibited words.

Certain embodiments of the disclosure may provide one or more technical advantages. A technical advantage of one embodiment may be that any amount of input text may be examined without requiring excessive amounts of memory, time, or processing power to determine whether the input text contains prohibited words and/or phrases. In addition, some embodiments may be "open" in order to accept text from a variety of different software programs.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which:

FIG. 2 is a flow chart illustrating a text adjudication method in accordance with a particular embodiment of this disclosure.

DETAILED DESCRIPTION OF THE DRAWINGS

Figure 3:
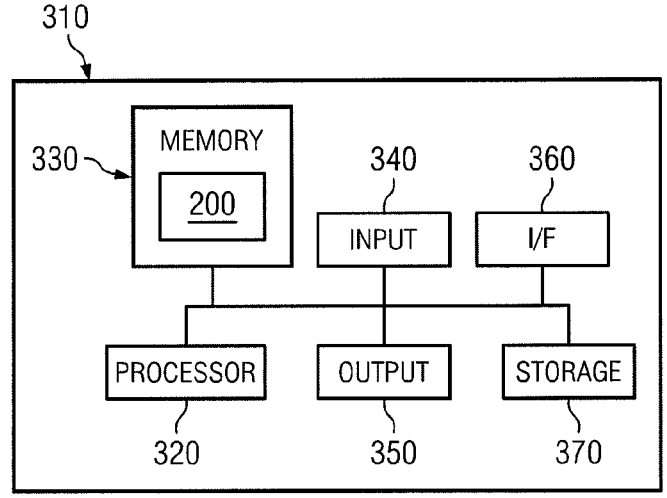
FIG. 3 is a system where particular embodiments of the disclosure may be implemented.

Embodiments of the present disclosure and its advantages are best understood by referring to FIGS. 1 through 3 of the drawings, like numerals being used for like and corresponding parts of the various drawings.

The verification or "adjudication" of text is a routine procedure for many organizations. In a governmental entity, for example, the text of emails may be adjudicated against a predefined policy in order to determine if any sensitive or otherwise prohibited information has been divulged.

Figure 1A:
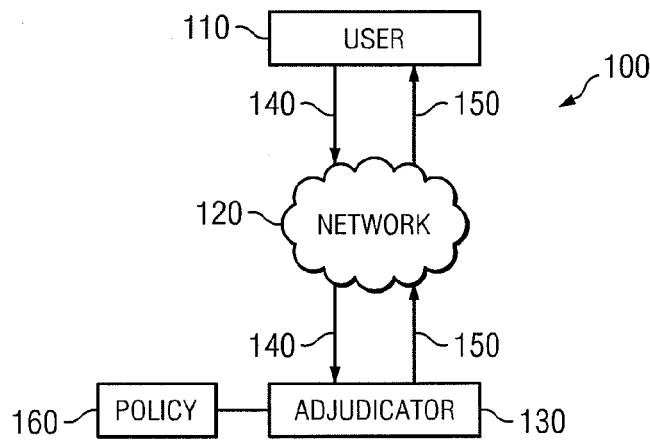
FIG. 1A is a simplified schematic diagram illustrating a system that may be utilized to adjudicate text against a defined policy.

FIG. 1A is a diagram of a system 100 that may be utilized to adjudicate text according to the teachings of the disclosure. FIG. 1A illustrates a user 110, a network 120, an adjudicator 130, an input message 140, a response message 150, and a system policy 160. User 110 and adjudicator 130 are each communicatively coupled to and communicate with each other via network 120. In some embodiments, however, user 110 may be communicatively coupled directly to adjudicator 130.

In operation, user 110 sends input message 140 to adjudicator 130 via network 120 so that adjudicator 130 may determine whether text in input message 140 contains prohibited words and/or phrases as defined in system policy 160. Adjudicator 130 receives input message 140 and system policy 160 and processes text in input message 140 along with system policy 160 according to teachings of the disclosure. System policy 160 is generally an electronic data file that includes prohibited words and/or phrases. Adjudicator 130 then creates response message 150 and sends response message 150 to user 110 via network 120. Example embodiments of input message 140 and response message 150 are illustrated below in FIGS. 1B and 1C, respectively, and an example embodiment of adjudicator 130 is illustrated below in FIG. 2.

In general, network 120 may include at least a portion of a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Figure 1B:
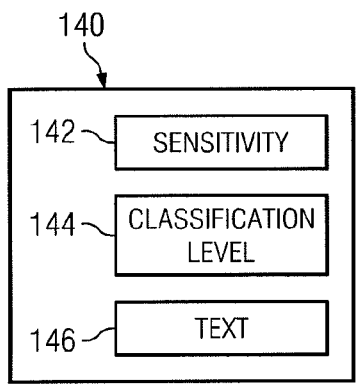
FIG. 1B is a simplified schematic diagram illustrating an input message that may be utilized by the system in FIG. 1A.

Input message 140 may be any electronic message containing text to be adjudicated against system policy 160. In one embodiment, for example, input message 140 may be a Simple Object Access Protocol ("SOAP") message. As illustrated in FIG. 1B, an example input message 140 includes a sensitivity level 142, a classification level 144, and text 146. Text 146 may be any amount of text that is to be adjudicated against system policy 160. Sensitivity level 142 may be any caveat or restriction on who is authorized to view text 146, and may include sensitivity levels such as "no foreign nationals", "program X", and the like. Classification level 144 may be any identifier to describe the level of classification of text 146 such as "unclassified", "confidential", "secret", "top secret", and the like.

Figure 1C:
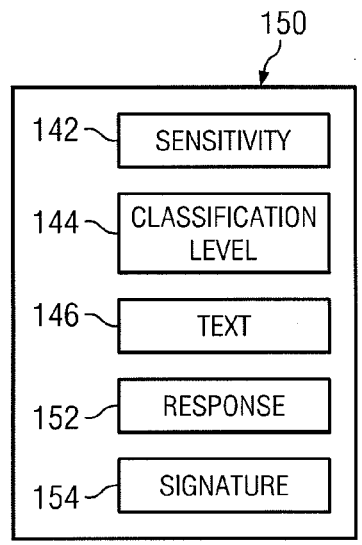
FIG. 1C is a simplified schematic diagram illustrating a response message that may be utilized by the system in FIG. 1A.

Once adjudicator 130 adjudicates text 146 in input message 140 and determines whether text 146 contains prohibited words and/or phrases as defined in system policy 160, adjudicator 130 creates and communicates response message 150 to user 110. As illustrated in FIG. 1C, an example response message 150 includes a response 152, a signature 154, sensitivity level 142, classification level 144, and text 146. Response 152 may be any appropriate response to indicate whether or not text 146 contains prohibited words and/or phrases, and may include responses such as "yes", "no", "more information needed", and the like. Signature 154 may be any form of a digital signature known in the art. In some embodiments, response message 150 may be a SOAP message.

Typical text adjudication tools are proprietary and employ strict prohibited word searches in order to determine whether an input text such as text 146 contains prohibited words and/or phrases. These word searches test every word of the input text against every possible known prohibited word. While such text adjudication tools may be effective at locating prohibited words in an input text, they typically require an increasing amount of time and processing power that is proportional to the amount of input text. In typical situations with more than a nominal amount of input text, the amount of processing time and resources is excessive and unreasonable. The problem compounds itself if the prohibited words have associations (i.e., there are prohibited phrases).

The teachings of the disclosure recognize that it would be desirable for a text adjudication tool to be scalable to allow it to adjudicate any amount input text without requiring excessive amounts of memory, time, or processing power to determine whether the input text contains prohibited words and/or phrases. In addition, teachings of the disclosure recognize that it would be desirable for a text adjudication tool to be "open" to allow it to accept text from a variety of different software programs. FIGS. 2 and 3 below illustrate a system and method of addressing problems associated with typical text adjudication tools.

FIG. 2 is a text adjudication method 200 according to the teachings of the disclosure. Text adjudication method 200 may be utilized by adjudicator 130 described above in order to determine whether text 146 in input message 140 contains prohibited words and/or phrases. Text adjudication method 200 may be implemented as an "open" platform that allows it to accept input messages 140 from a variety of software programs.

Text adjudication method 200 begins in step 210 where one or more system polices 160 are received. In some embodiments, system policy 160 is an electronic data file written in the Extensible Markup Language (XML) that includes prohibited words and/or phrases for a particular sensitivity and class of input text. For example, a particular embodiment of system policy 160 is illustrated below:

```
<POLICY CLASSIFICATION="secret" SENSITIVITY="no foreign">
<BAD WORD>
   <THRESHOLD> 6 </THRESHOLD>
   <WORD word="star">
     <hit points> 3 </hit points>
     <ASSOCIATED WORDS>
       <AS_WORD proximity="2" hitpoints="2"> wars
       </AS_WORD>
       <AS_WORD proximity="2" hitpoints="3"> program
       </AS_WORD>
     </ASSOCIATED WORDS>
   </WORD>
</BAD WORD>
<BAD WORD>
   <THRESHOLD> 2 </THRESHOLD>
```

-continued

```
   <WORD word="alpha">
     <hit points> 2 </hit points>
   </WORD>
</BAD WORD>
<BAD WORD>
   <THRESHOLD> 2 </THRESHOLD>
   <WORD word="sigma">
     <hit points> 2 </hit points>
   </WORD>
</BAD WORD>
. . .
```

As illustrated above, system policy 160 may include one or more prohibited ("bad") words (such as "star", "sigma", and "alpha" in this example), a threshold value for each bad word, and a hit point value for each word. System policy 160 may also include one or more groups of associated prohibited ("bad") words and a hit point value for each associated bad word. The hit point values may correspond to the significance of its associated word. In the embodiment above, for example, the bad word "star" has associated bad words "wars" and "program" that are prohibited from appearing together in text 146. In addition, each associated bad word has a proximity value. In this example, the associated word "wars" has a proximity value of "2" which indicates that it must appear within two words of the word "star" to be considered an associated bad word. Furthermore, each bad word in this associated group has a hit point value, and the associated group has a threshold value of six. The calculation of hit point values and their evaluation is discussed in more detail below.

The embodiment of system policy 160 above also includes a classification level and a sensitivity level. In the above example, the classification level is "secret" and the sensitivity level is "no foreign". The use of the classification and sensitivity levels are also discussed in more detail below.

In step 215, text adjudication method 200 creates a system datastructure for each received system policy 160. For example, the following is one embodiment of a system datastructure that may be created for the system policy 160 illustrated above:

| | | |
|---|---|---|
| [0] -> | NULL | |
| [1] -> | alpha -> | NULL |
| | hit points = 2 | |
| [2] -> | NULL | |
| [3] -> | NULL | |
| . | | |
| . | | |
| . | | |
| [16]-> | program -> | NULL |
| | hit points = 3 | |
| [17]-> | NULL | |
| [18]-> | NULL | |
| [19]-> | star -> | sigma -> NULL |
| | hit points = 3 | hit points = 2 |
| | max = 6 | |
| | LL word = wars | |
| | LL points = 2 | |
| | proximity = 2 | |
| | LL word = program | |
| | LL points = 3 | |
| | proximity = 2 | |
| . | | |
| . | | |
| . | | |
| [23]-> | wars -> | NULL |
| | hit points = 2 | |
| [24]-> | NULL | |
| [25]-> | NULL | |
| [26]-> | NULL | |

In this embodiment, the system datastructure is an array of linked lists, commonly referred to as a hash table. The system datastructure has twenty seven linked lists (i.e., indices) numbered 0 to 26. Index [0] is the first linked list (hereinafter referred to as the "head" position) and is initially empty (i.e., "NULL"). The remaining indices [1] through [26] correspond to the letters of the alphabet. Index [1] corresponds to the letter "a", index [2] corresponds to the letter "b", index [3] corresponds to the letter "c", and so forth.

To create the system datastructure above, text adjudication method 200 first reads system policy 160 and places each bad word and associated bad word in the appropriate index of the system datastructure according to the first letter of the bad word. In the embodiment of system policy 160 illustrated above, for example, the bad words and associated bad words are "star", "wars", "program", "alpha", and "sigma".

Text adjudication method 200 begins by placing bad word "star" at index [19] of the system datastructure since index [19] corresponds to the letter "s" and the bad word "star" begins with the letter "s". Text adjudication method 200 then places associated bad word "wars" at index [23] of the system datastructure since index [23] corresponds to the letter "w" and the associated bad word "wars" begins with the letter "w". Text adjudication method 200 repeats this process for each bad word and associated bad word in system policy 160 until every bad word and associated bad word is placed in the appropriate index the system datastructure.

For indices of the system datastructure with more than one bad word, each bad word will be linked to subsequent bad words that have the same first letter. For example, in the system policy 160 illustrated above, there are two bad words that begin with the letter "s": "star" and "sigma". In building the system datastructure, text adjudication method 200 first places "star" at index [19] as described above. Text adjudication method 200 then places "sigma" at index [19] and a link between "star" and "sigma". If another bad word is found in system policy 160 that begins with the letter "s", it would be placed in a similar manner at index [19] with a link to "sigma". The last bad word with the letter "s" in index [19] has a link to "NULL" signifying that it is the last word in the index. In this example, "sigma" is the last bad word in system policy 160 that begins with the letter "s" and therefore has a link to "NULL".

Once all bad words from system policy 160 are placed in the appropriate index of the system datastructure, text adjudication method 200 then adds the hit point value, any associated bad words, the hit point value for any associated bad word, a proximity value for each bad word in the system datastructure, and the threshold ("max") value each group. For example, in the system policy 160 illustrated above, bad word "star" has a hit point value of "3" and associated bad words "wars" and "program". Text adjudication method 200 therefore places "hit points=3" in the system datastructure adjacent to bad word "star" as seen above. Additionally, text adjudication method 200 identifies the associated bad words to "star" in system policy 160, which are "wars" and "program" in this example. Text adjudication method 200 then creates a linked list pointer to each associated bad word. For example, in the system datastructure above, text adjudication method 200 places "LL word=wars" and "LL word=program" in the system datastructure adjacent to "star" along with their hit point values ("LL points") and proximity values ("proximity"). Text adjudication method 200 repeats this process for each bad word in system policy 160 until all hit point values and associated bad words are placed in the system datastructure.

In step 220, text adjudication method 200 waits to receive input message 140. In step 225, text adjudication method 200 receives input message 140.

In step 230, text adjudication method 200 selects an appropriate system policy 160 for input message 140. As described above, input message 140 may include sensitivity level 142, classification level 144, and text 146. For example, a particular embodiment of input message 140 may contain a sensitivity level 142 of "no foreign", a classification level 144 of "secret", and a text 146 of "I went to see Star Wars at the movie theater." To select an appropriate system policy 160 for this particular input message 140, text adjudication method 200 first identifies the classification level of input message 140 as "secret." Text adjudication method 200 next selects a system policy 160 that corresponds to a classification level of "secret." For example, the system policy 160 discussed above in reference to step 210 has a classification level of "secret" and may be selected as an appropriate system policy 160 for the example input message 140.

In step 235, text adjudication method 200 may normalize text 146 in input message 140. In this step, text adjudication method 200 attempts to identify and eliminate special characters, formatting, encoding, and any other attempt by a user to conceal information in text 146. For example, if text 146 contains the text "Sam discussed the $tar war$ program", text adjudication method 200 may normalize the text by converting every "$" to an "s". This results in text 146 becoming "Sam discussed the star wars program." In another example, text 146 may contain the text "Sam discussed the star_wars_program." Here, text adjudication method 200 may normalize the text by converting every "_" to space. This again results in text 146 becoming "Sam discussed the star wars program." Other embodiments may normalize text in additional/alternative ways such as identifying and removing excess spaces, identifying known text encoding techniques, identifying and correcting misspellings, and the like. In some embodiments, if text adjudication method 200 detects that text 146 contains excessive amounts of subversion attempts, text adjudication method 200 may generate a response 152 such as "more information needed" as described above.

In step 240, text adjudication method 200 creates a temporary datastructure according to text 146 in input message 140. To create the temporary datastructure for a particular input message 140, text adjudication method 200 copies (or duplicates) the system datastructure corresponding to the system policy 160 selected in step 230 to create the temporary datastructure. Because the temporary datastructure is created by copying (or duplicating) the system datastructure, it is initially identical to the selected system datastructure and has an empty head position (i.e., index [0]→NULL). The head of the temporary datastructure, however, is modified in subsequent steps of text adjudication method 200 according to text 146 in input message 140.

In step 245, text adjudication method 200 processes text 146 (or the normalized text 146 in embodiments that utilize step 240 above) in order to divide text 146 into one or more smaller groups of N words. N may be a predetermined integer, and may be any appropriate integer to allow efficient processing of text 146. For example, if N is four and text 146 is "Sam went to see Star Wars at the movie theater", text adjudication method 200 in step 245 would divide this text into three groups: the first group would contain the first four words "Sam went to see", the second group would contain the next four words "Star Wars at the", and the third group would contain the remaining words "movie theater." If text 146 contains less than N words, then there will be one group containing all of the words of text 146. It should be noted, however, that text adjudication method 200 is not limited to processing text 146 into groups of four words. In some embodiments, for example, N may be chosen to be a higher or lower integer. In some embodiments, N may be chosen to be the integer sixteen.

Once text 146 is divided into one or more smaller groups of N words in step 245, text adjudication method 200 in step 250 scans the temporary datastructure created in step 240 for each word in the group of N words to determine if there are any matches (i.e., bad words). To do this, text adjudication method 200 processes a single group of N words at a time and repeats this process until all groups and thus all words of text 146 have been processed. For instance, in the example provided above in which text 146 is "Sam went to see Star Wars at the movie theater", text adjudication method 200 first selects the first group of words created in step 245 and searches for the words in the temporary datastructure created in step 240. To perform this search, text adjudication method 200 searches the temporary datastructure according to the first letter of the words. For example, text adjudication method 200 would identify a word in the first group (i.e., "Sam"), identify the first letter as "s", and identify the index in the temporary datastructure corresponding to this letter (i.e., index [19]). Text adjudication method 200 would then compare the first word at index [19] in temporary datastructure with the word "Sam". In this example, the first word at index [19] in the temporary datastructure illustrated above is "star". If the words do not match (as is the case in this example), text adjudication method 200 moves to the next word in the chain at this index and again compares the words. In this example, the next word in the temporary datastructure illustrated above is "sigma" and therefore is not a match for "Sam." Text adjudication method 200 follows the chain of words at the selected index of the temporary datastructure until there is a match found or the end of the chain (i.e., "NULL") is reached. If a match is found, the word is recorded in the head position of the temporary datastructure, along with other information as described below. If a match is not found, the word is not recorded in the head position and the search for the word ends.

In some embodiments, a separate processing thread may be spawned for each word search described above in order to take advantage of a multi-thread capable processor. In such embodiments, it is beneficial to choose an integer N that corresponds to the thread capability of the processor. For example, if step 250 above is performed by a computer system have a processor capable of processing four threads at a time and N is chosen to be four as in the above example, a separate thread may be used to search the temporary datastructure for each of the four words of each group at the same time. By processing every word of each group of N words in parallel, the processing time required to search the temporary datastructure for all N words of a group may be greatly reduced.

Text adjudication method 200 performs the word searches described above for every word in the selected group of N words. Once the temporary datastructure has been searched for all N words in the selected group, text adjudication method 200 selects another group of N words and repeats the search process. This process continues until every group of N words has been selected and thus the temporary datastructure has been searched for every word of text 146.

By searching the index of the temporary datastructure corresponding to the first letter of each word of text 146, text adjudication method 200 offers significant advantages over previous text verification tools. Whereas most text verification tools test every word of a text against all known prohibited words, text adjudication method 200 improves the process by jumping to the index of the temporary datastructure that corresponds to the first letter of a search word. Text adjudication method 200 follows the chain of words at the appropriate index and compares each word to the search word. Once the end of the chain is reached or a match is found at the selected index, text adjudication method 200 ends the search for the search word and moves on to the next search word. This greatly reduces the amount of searching required to adjudicate text 146. As a result, the amount of time and processing power required to adjudicate text 146 is greatly reduced from previous methods.

If no matches are found in the temporary datastructure for any words in text 146 in step 250 (i.e., there are no bad words in text 146 and thus index [0] of the temporary datastructure is empty), text adjudication method 200 proceeds to step 270 below. If, however, bad words are found in text 146 in step 250, text adjudication method 200 proceeds to step 260 where text 146 is examined for associated bad words.

As described above, if a match is found in the temporary datastructure for a word in text 146 in step 250, text adjudication method 200 records the word in the head position of the temporary datastructure. For example, if text 146 includes "Sam went to see Star Wars at the movie theater", the head position of the temporary datastructure may be the following after step 250:

[0]-> star ->                       wars ->        NULL
      phrase = to see star wars at where the presence of the words "star" and "wars" at the head position indicates that both prohibited words were found in text 146. In addition, text adjudication method 200 may record a proximity string of text adjacent to each bad word in the head position according to the word's proximity value as found in the system datastructure. As seen above, for example, text adjudication method 200 may record "phrase=to see star wars at" at the head position adjacent to "star" because the maximum proximity value associated with "star" in the system datastructure is "2". As seen in this example, the proximity value indicates how many words before and after the bad word "star" to record.

In step 260, text adjudication method 200 determines if there are any associated bad words as defined in system policy 160. To do this, text adjudication method 200 selects the first bad word in the head position (in this example, "star") and locates the word in the appropriate index of the temporary datastructure according to the first letter of the bad word (in this example, index [19]). Text adjudication method 200 then locates and records the hit point value associated with the first bad word that was placed adjacent to the bad word in step 215 (in this example, "3").

Next, text adjudication method 200 searches for an associated bad word to the first bad word ("star"). To do this, text adjudication method 200 first reads any phrase associated with the bad word in the head position. The bad word "star", for example, has the phrase "to see star wars at." Text adjudication method 200 next locates an associated word to look for in this phrase by looking in index [19] to see if "star" has any "LL word" entries. In this case, "star" has two "LL word" entries: "wars" and "program." Text adjudication method 200 therefore searches the phrase "to see star wars at" to see if either "wars" or "program" is found. If so, text adjudication method 200 determines how far each word is from the word "star" and compares it to the word's proximity value in index

[19]. For example, "wars" has a proximity value of "2" and is located within 2 words of "star", and "program" has a proximity value of "2" and is not found within 2 words of "star". For each associated bad word that is within its associated proximity value of the bad word, text adjudication method 200 reads its hit point value and adds it to the hit point value of the bad word. In this case, "star" had a hit point value of 3 and "war" had a hit point value of 2. The total therefore would be 5.

After text adjudication method 200 had explored all associated bad words for a particular bad word, it compares the total hit point values it found to the "max" threshold value for the bad word. If the total hit points are greater than the threshold value, text adjudication method 200 proceeds to step 265. If the total hit point values are less than the threshold value, however, text adjudication method 200 will proceed to the next bad word in the head position of the temporary datastructure and repeat the process described above for each bad word until the threshold value is exceeded or a NULL is reached in the head position. Once a NULL is reached, text adjudication method 200 proceeds to step 265.

In step 265, text adjudication method 200 makes a decision regarding text 146 in input message 140. If the threshold value was exceeded in step 260, text adjudication method 200 may determine that text 146 contains information that violates system policy 160. If, however, text adjudication method 200 did not find any bad words in text 146 in step 260, or if no threshold value was exceeded in step 260, text adjudication method 200 may determine that text 146 does not contain information that violates system policy 160.

In step 270, some embodiments of text adjudication method 200 may destroy the temporary datastructure that was created in step 240 in order to increase security. This may be done, for example, to eliminate any classified or sensitive information that may have been disclosed in text 146.

In step 275, text adjudication method 200 sends a response such as response 152 according to the decision that was made in step 265. For example, if it was determined that text 146 contains information that violates system policy 160, text adjudication method 200 may send a "yes" response, or any response to indicate that text 146 contains prohibited information. If, however, it was determined in step 265 that text 146 does not contain information that violates system policy 160, text adjudication method 200 may send a "no" response, or any response to indicate that text 146 does not contain prohibited information Text adjudication method 200 may be implemented in many ways including, but not limited to, software stored on a computer-readable medium. FIG. 3 below illustrates an embodiment where the methods described in FIGS. 1 through 2 may be implemented.

FIG. 3 is block diagram illustrating a portion of a system 310 that may be used to determine whether text in an input message contains prohibited words and/or phrases according to one embodiment. System 310 includes a processor 320, a memory device 330, an input device 340, an output device 350, communication interface 360, and a storage device 370. The components 320-370 of system 310 may be coupled to each other in any suitable manner. In the illustrated embodiment, the components 320-370 of system 310 are coupled to each other by a bus.

Processor 320 generally refers to any suitable device capable of executing instructions and manipulating data to perform operations for system 310. For example, processor 320 may include any type of central processing unit (CPU).

Memory device 330 may refer to any suitable device capable of storing and facilitating retrieval of data. Examples of memory device 330 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. In this example, text adjudication method 200 embodied as logic within memory device 330 generally determines whether an input message contains prohibited words and/or phrases. Alternatively, text adjudication method 200 may reside within any of a variety of other suitable computer-readable medium, including, for example, storage device 370.

Input device 340 may refer to any suitable device capable of inputting, selecting, and/or manipulating various data and information. For example, input device 340 may include a keyboard, mouse, graphics tablet, joystick, light pen, microphone, scanner, or other suitable input device.

Output device 350 may refer to any suitable device capable of displaying information to a user. For example, output device 350 may include a video/graphical display, a printer, a plotter, or other suitable output device.

Communication interface 360 may refer to any suitable device capable of receiving input for system 310, sending output from system 310, performing suitable processing of the input or output or both, communicating to other devices, or any combination of the preceding. For example, communication interface 360 may include appropriate hardware (e.g., modem, network interface card, etc.) and software, including protocol conversion and data processing capabilities, to communicate through a LAN, WAN, or other communication system that allows system 310 to communicate to other devices. Communication interface 360 may include one or more ports, conversion software, or both.

Storage device 370 may refer to any suitable device capable of storing computer-readable data and instructions. Storage device 370 may be similar to memory device 330 as described above.

The components of system 310 may be integrated or separated. In some embodiments, components 320-370 may each be housed within a single chassis. The operations of system 310 may be performed by more, fewer, or other components. Additionally, operations of system 310 may be performed using any suitable logic that may comprise software, hardware, other logic, or any suitable combination of the preceding.

Although the embodiments in the disclosure have been described in detail, numerous changes, substitutions, variations, alterations, and modifications may be ascertained by those skilled in the art. For example, FIG. 1B depicts a certain embodiment of an input message 140. Input message 140, however, may be any form of a message that contains text to adjudicate. In addition, while the methods disclosed herein have been described with reference to system 310, certain embodiments may utilize more than one computing system to execute and/or run the disclosed methods. It is intended that the present disclosure encompass all such changes, substitutions, variations, alterations and modifications as falling within the spirit and scope of the appended claims.

What is claimed is:

1. A computerized method of adjudicating text against a policy comprising:

receiving one or more system policies comprising one or more prohibited words and a first hit value corresponding to each prohibited word, the first hit value indicating the significance of the prohibited word;

creating a system datastructure for each received system policy, each system datastructure further comprising:
  a hash table comprising a plurality of linked lists corresponding the letters of the alphabet; and
  a head linked list operable to store one or more found prohibited words;
receiving an input message comprising text to be adjudicated;
selecting a system policy from the one or more received system policies based on the input message; and
determining whether a prohibited word is present in the text to be adjudicated by processing the text to be adjudicated and the system datastructure corresponding to the selected system policy,
wherein the one or more system policies further comprise a group of associated prohibited words, the group comprising:
  a threshold value corresponding to the group of associated prohibited words;
  an associated prohibited word, the associated prohibited word being associated to one of the one or more prohibited words;
  a second hit value corresponding to the associated prohibited word; and
  proximity value corresponding to the associated prohibited word.

2. The computerized method of adjudicating text against a policy of claim 1, wherein each linked list corresponding to a letter of the alphabet comprises the prohibited words from the system policy that begin with a corresponding letter of the alphabet and the first hit value associated with each prohibited word.

3. The computerized method of adjudicating text against a policy of claim 2, wherein the determining whether a prohibited word is present in the text to be adjudicated by processing the text to be adjudicated and the system datastructure corresponding to the selected system policy comprises:
  creating a temporary datastructure by duplicating the system datastructure corresponding to the selected system policy;
  selecting a word from the text to be adjudicated;
  identifying a linked list in the temporary datastructure that corresponds to the first letter of the selected word;
  searching the identified linked list for the selected word;
  recording the selected word in the head linked list of the temporary datastructure if the selected word is found in the identified linked list; and
  repeating the selecting a word, identifying a linked list, searching the identified linked list for the selected word, and recording the selected word in the head linked list of the temporary datastructure if the selected word is found in the identified linked list until every word in the text to be adjudicated has been searched.

4. The computerized method of adjudicating text against a policy of claim 1, wherein the input message comprises a Simple Object Access Protocol message.

5. The computerized method of adjudicating text against a policy of claim 1 wherein each system datastructure further comprises the associated prohibited word, the second hit value, and the threshold value.

6. The computerized method of adjudicating text against a policy of claim 5 further comprising determining whether the text contains the associated prohibited word by processing the text and the system datastructure corresponding to the selected system policy, the processing comprising:
  selecting a found prohibited word from the head linked list having an associated prohibited word;
  determining a proximity string of text associated with the selected found prohibited word;
  searching the proximity string of text for the associated prohibited word; and
  determining whether the proximity string of text comprises the associated prohibited word.

7. The computerized method of adjudicating text against a policy of claim 6 further comprising:
  determining whether the threshold value has been exceeded by adding the first hit value corresponding to the found prohibited word and the second hit value corresponding to the associated prohibited word to determine a total hit value; and
  determining whether the total hit value is greater than the threshold value.

8. The computerized method of adjudicating text against a policy of claim 7 further comprising sending a response message corresponding to whether the threshold value has been exceeded, the response message comprising a Simple Object Access Protocol message.

9. The computerized method of adjudicating text against a policy of claim 1 further comprising normalizing the text to be adjudicated, the normalizing comprising:
  identifying an attribute of the text as an attempt to conceal information; and
  removing the attribute;
wherein the attribute comprises a special character, formatting, and encoding.

10. The computerized method of adjudicating text against a policy of claim 1, wherein the determining whether a prohibited word is present in the text to be adjudicated by processing the text to be adjudicated and the system datastructure corresponding to the selected system policy comprises:
  creating a temporary datastructure by duplicating the system datastructure corresponding to the selected system policy;
  selecting a group of words from the text to be adjudicated, the number of words in the group corresponding to a number of processing threads of a processor;
  simultaneously processing the selected group of words, the processing further comprising:
    spawning a processor thread for each word in the selected groups of words;
    identifying a linked list in the temporary datastructure that corresponds to the first letter of each word in the group of words;
    searching the identified linked list for the word;
    recording the word in the head linked list of the temporary datastructure if the word is found in the identified linked list; and
  repeating the selecting a group of words and simultaneously processing the selected group of words until every word in the text to be adjudicated has been processed.

11. The computerized method of adjudicating text against a policy of claim 1 further comprising sending a response message corresponding to whether a prohibited word is present in the text to be adjudicated, the response message comprising a Simple Object Access Protocol message.

12. A computerized method of adjudicating text against a policy comprising:
  receiving one or more system policies, each system policy comprising:
    one or more prohibited words;
    one or more groups of associated prohibited words;
    a first hit value for each prohibited word, the hit value indicating the significance of the prohibited word;

a second hit value for each associated prohibited word, the hit value indicating the significance of the associated prohibited word;

a proximity value corresponding to each associated prohibited word; and a threshold value for each group of associated prohibited words, the threshold value indicating a limit on the hit values for the associated prohibited words in the group;

creating a system datastructure for each received system policy, each system datastructure comprising a hash table, the hash table comprising a plurality of linked lists corresponding the letters of the alphabet;

receiving an input message comprising a text to be adjudicated;

selecting a system policy from the one or more received system policies based on the input message; and determining whether the text contains any prohibited associated words from the one or more prohibited associated words by processing the text and the system datastructure corresponding to the selected system policy, wherein the determining whether the text contains any prohibited associated words from the one or more prohibited associated words by processing the text and the system datastructure corresponding to the selected system policy comprises:

creating a temporary datastructure by duplicating the system datastructure corresponding to the selected system policy;

selecting a word from the text to be adjudicated;

identifying a linked list in the temporary datastructure that corresponds to the first letter of the selected word;

searching the identified linked list for the selected word;

recording the selected word as a found prohibited word in a head linked list of the temporary datastructure if the selected word is found in the identified linked list;

recording a proximity string of text associated with each prohibited word in the head linked list of the temporary datastructure if the selected word is found in the identified linked list;

searching the proximity string of text for the associated prohibited word; and determining whether the proximity string of text comprises the associated prohibited word.

13. The computerized method of adjudicating text against a policy of claim 12, wherein the input message comprises a Simple Object Access Protocol message.

14. The computerized method of adjudicating text against a policy of claim 12, wherein:

each linked list in the system datastructure comprises the prohibited words from the system policy that begin with a corresponding letter of the alphabet and the first hit value associated with each prohibited word; and each system datastructure further comprises the associated prohibited words, the second hit values, and the threshold values.

15. The computerized method of adjudicating text against a policy of claim 12 further comprising determining whether the threshold value has been exceeded, the determining comprising:

adding the first hit value corresponding to the found prohibited word and the second hit value corresponding to the associated prohibited word to determine a total hit value; and determining whether the total hit value is greater than the threshold value.

16. The computerized method of adjudicating text against a policy of claim 15 further comprising sending a response message corresponding to whether the threshold value has been exceeded, the response message comprising a Simple Object Access Protocol message.

17. The computerized method of adjudicating text against a policy of claim 12 further comprising normalizing the text to be adjudicated, the normalizing comprising:

identifying an attribute of the text as an attempt to conceal information; and removing the attribute;

wherein the attribute comprises a special character, formatting, and encoding.

18. The computerized method of adjudicating text against a policy of claim 12 further comprising sending a response message corresponding to whether a prohibited associated word is present in the text to be adjudicated, the response message comprising a Simple Object Access Protocol message.

* * * * *

UNITED STATES PATENT AND TRADEMARK OFFICE
Certificate

Patent No. 8,234,259 B2

Patented: July 31, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Randall S. Brooks, Apollo Beach, FL (US); Ricardo J. Rodriguez, Palmetto, FL (US); Sylvia A. Traxler, Seminole, FL (US); and Daniel Teijido, Clearwater, FL (US).

Signed and Sealed this Twentieth Day of May 2014.

PIERRE VITAL
*Supervisory Patent Examiner*
Art Unit 2162
Technology Center 2100